(12) United States Patent
Henderson et al.

(10) Patent No.: US 10,606,301 B2
(45) Date of Patent: Mar. 31, 2020

(54) TACTILE GAIN CONTROL

(71) Applicant: GE Aviation Systems Limited, Cheltenham, Gloucestershire (GB)

(72) Inventors: George R. Henderson, Cheltenham (GB); Keval Mehta, Cheltenham (GB)

(73) Assignee: GE Aviation Systems Limited, Cheltenham, Gloucestershire (GB)

( * ) Notice: Subject to any disclaimer, the term of this patent is extended or adjusted under 35 U.S.C. 154(b) by 0 days.

(21) Appl. No.: 16/007,275

(22) Filed: Jun. 13, 2018

(65) Prior Publication Data

US 2018/0373286 A1 Dec. 27, 2018

(30) Foreign Application Priority Data

Jun. 27, 2017 (GB) .................................. 1710226.0

(51) Int. Cl.
| | |
|---|---|
| *G05G 5/03* | (2008.04) |
| *G06F 3/01* | (2006.01) |
| *B64D 43/00* | (2006.01) |
| *G06F 3/0362* | (2013.01) |
| *G06F 3/0354* | (2013.01) |
| *G06F 3/038* | (2013.01) |

(Continued)

(52) U.S. Cl.
CPC ............. *G05G 5/03* (2013.01); *B64C 13/042* (2018.01); *B64C 13/18* (2013.01); *B64D 43/00* (2013.01); *G06F 3/016* (2013.01); *G06F 3/038* (2013.01); *G06F 3/0362* (2013.01); *G06F 3/03547* (2013.01); *G06F 3/04847* (2013.01); *H01H 19/14* (2013.01); *G05G 1/08* (2013.01)

(58) Field of Classification Search
CPC . G05G 5/03; G05G 1/08; B64D 43/00; G06F 3/016; G06F 3/03547; G06F 3/0362; G06F 3/038; G06F 3/04847; H01H 19/14

USPC ...................................................... 340/407.2
See application file for complete search history.

(56) References Cited

U.S. PATENT DOCUMENTS

| 5,872,528 A | 2/1999 | Gaultier et al. |
|---|---|---|
| 2013/0335321 A1 | 12/2013 | Sugigta et al. |

(Continued)

FOREIGN PATENT DOCUMENTS

| DE | 199 36 257 A1 | 2/2001 |
|---|---|---|
| GB | 2 361 292 A | 10/2001 |
| JP | 2010-055792 A | 3/2010 |

OTHER PUBLICATIONS

Combined Search and Examination Report issued in connection with corresponding GB Application No. 1710226.0 dated Nov. 30, 2017.

*Primary Examiner* — Jack K Wang
(74) *Attorney, Agent, or Firm* — Dority & Manning, P.A.

(57) ABSTRACT

One example aspect of the present disclosure relates to a method for receiving input. The method can include receiving, by one or more processors, data indicative of finger placement on a three dimensional knob that is associated with a parameter. The method can include determining, by the one or more processors, a height associated with the data indicative of finger placement. The method can include determining, by the one or more processors, a gain associated with the parameter based on the height. The method can include receiving, by the one or more processors, a signal indicative of an adjustment to the parameter. The method can include causing, by the one or more processors, an adjustment to the parameter based on the determined gain and the signal indicative of an adjustment to the parameter.

20 Claims, 9 Drawing Sheets

(51) Int. Cl.
    *H01H 19/14*     (2006.01)
    *G06F 3/0484*     (2013.01)
    *B64C 13/04*     (2006.01)
    *B64C 13/18*     (2006.01)
    *G05G 1/08*     (2006.01)

(56) References Cited

U.S. PATENT DOCUMENTS

| | | | |
|---|---|---|---|
| 2016/0191055 A1* | 6/2016 | Hoskins | G01S 17/026 |
| | | | 250/341.7 |
| 2016/0362175 A1* | 12/2016 | De Bossoreille | G06F 3/041 |
| 2018/0059850 A1* | 3/2018 | Kerr | G06F 3/0362 |
| 2018/0321747 A1* | 11/2018 | Chu | G06F 3/03547 |

* cited by examiner

TACTILE GAIN CONTROL

FIELD

The present subject matter relates generally to aerial vehicles.

BACKGROUND

An aerial vehicle can include various systems. The various systems can take in input from users through various input devices, such as knobs or rotary dials. Adjustment of an input device can adjust a parameter, such as a heading of the aerial vehicle, an altitude of the aerial vehicle, a cabin temperature of the aerial vehicle, etc. If a gain associated with the input device is too large, then a user may not be able to control the parameter with an appropriate precision. If a gain associated with the input device is too small, then it can take too long to adjust the parameter over a wide range of values.

BRIEF DESCRIPTION

Aspects and advantages of embodiments of the present disclosure will be set forth in part in the following description, or may be learned from the description, or may be learned through practice of the embodiments.

One example aspect of the present disclosure relates to a method for receiving input. The method can include receiving, by one or more computing devices, data indicative of finger placement on a three dimensional knob that is associated with a parameter. The method can include determining, by the one or more computing devices, a height associated with the data indicative of finger placement. The method can include determining, by the one or more computing devices, a gain associated with the parameter based on the height. The method can include receiving, by the one or more computing devices, a signal indicative of an adjustment to the parameter. The method can include causing, by the one or more computing devices, an adjustment to the parameter based on the determined gain and the signal indicative of an adjustment to the parameter.

Another aspect of the present disclosure relates to a system for receiving input. The system can include a memory device. The system can include a three dimensional knob configured to adjust a parameter. The system can include one or more processors. The one or more processors can be configured to receive one or more signals indicative of finger placement on the three dimensional knob. The one or more processors can be configured to determine a height associated with the one or more signals. The one or more processors can be configured to determine a gain associated with the parameter based on the determined height. The one or more processors can be configured to receive a signal indicative of an adjustment to the parameter. The one or more processors can be configured to cause an adjustment to the parameter based on the determined gain and the signal indicative of an adjustment to the parameter.

Another aspect of the present disclosure relates to an aerial vehicle. The aerial vehicle can include a memory device. The aerial vehicle can include a three dimensional knob configured to adjust a parameter. The aerial vehicle can include one or more processors. The one or more processors can be configured to receive one or more signals indicative of finger placement on the three dimensional knob. The one or more processors can be configured to determine a height associated with the one or more signals. The one or more processors can be configured to determine a gain associated with the parameter based on the determined height. The one or more processors can be configured to receive a signal indicative of an adjustment to the parameter. The one or more processors can be configured to cause an adjustment to the parameter based on the determined gain and the signal indicative of an adjustment to the parameter.

Other example aspects of the present disclosure are directed to systems, methods, aerial vehicles, avionics systems, devices, non-transitory computer-readable media for receiving input. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
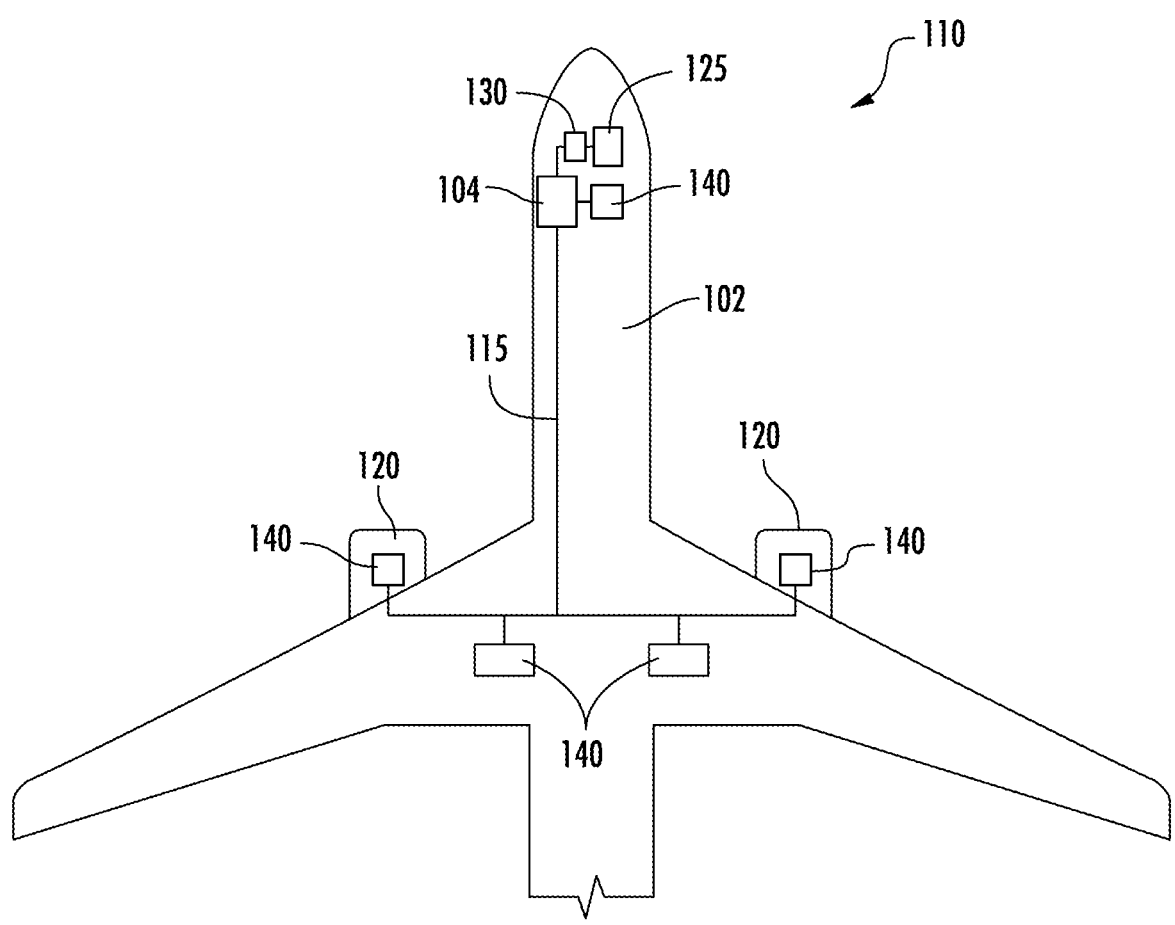
FIG. 1 depicts an aerial vehicle according to example embodiments of the present disclosure.

Reference now will be made in detail to embodiments, one or more examples of which are illustrated in the drawings. Each example is provided by way of explanation of the embodiments, not limitation of the embodiments. In fact, it will be apparent to those skilled in the art that various modifications and variations can be made in the present disclosure without departing from the scope or spirit of the invention. For instance, features illustrated or described as part of one embodiment can be used with another embodiment to yield a still further embodiment. Thus, it is intended that the present disclosure covers such modifications and variations as come within the scope of the appended claims and their equivalents.

As used in the specification and the appended claims, the singular forms "a," "an," and "the" include plural referents unless the context clearly dictates otherwise. The use of the term "about" in conjunction with a numerical value refers to within 25% of the stated amount.

An aerial vehicle can include numerous input devices to control various aspects related to the aerial vehicle. For example, one or more of the input devices can control a flight management system interface. Examples of input devices that control a flight management system interface can include an input device to select a heading or an input device to select an altitude. As another example, one or more of the input devices can control an internal environment of the aerial vehicle. An example of an input device that controls an internal environment of the aerial vehicle can include an input device to control a cabin temperature of the aerial vehicle.

According to example embodiments of the present disclosure, at least one of the input devices can include a three dimensional knob. The three dimensional knob can be used to adjust a parameter, such as parameters related to heading, altitude, cabin temperature, etc. The three dimensional knob can include touch sensors (e.g., capacitive touch sensors) to detect finger placement on the knob. Finger placement on the three dimensional knob can be used to determine a gain for adjustment of the parameter. The gain can control how much the three dimensional knob actuates the parameter.

Example embodiments include determining a height on the three dimensional knob of the one or more detected finger placements using signals from one or more touch sensors. A gain can be determined based on the determined height. In some embodiments, a method can include detecting a first finger touch and a second finger touch. The method can determine a first height based on the first detected touch and a second height based on the second touch. A gain can be determined based on the first height and the second height (e.g., based on the average height of the first height and the second height or other height value determined based on the first height and the second height).

In some embodiments, the three dimensional knob can be turned in two opposing directions. In response to the turning of the three dimensional knob, a parameter can be adjusted. An amount by which the parameter is adjusted can be based in part by the determined gain and in part by the amount that the knob is turned.

In some embodiments, the three dimensional knob can include a first end and a second end. The first end can be associated with a maximum height of the three dimensional knob. The second end can be associated with a minimum height of the three dimensional knob. In an embodiment, a minimum gain can be associated with the first end and a maximum gain can be associated with the second end. In an embodiment, an adjustment function correlating the gain with the height can be accessed. In embodiment, the gain can be determined based at least in part on the adjustment function. Optionally, the adjustment function can specify a linear relationship between the height and the gain. Optionally, the adjustment function can specify a non-linear relationship between the height and the gain.

In this way, the systems and methods according to example aspects of the present disclosure can have a number of technical effects and benefits. For instance, example aspects of the present disclosure can have a technical effect of allowing a user to change a gain associated with a parameter by changing a placement of the user's fingers, shortening the time it takes for a user to select a desired value for the parameter. This can require less user input to achieve a desired response, saving processing resources for responding to the user input.

In some embodiments, the systems and methods of the present disclosure also provide an improvement to a computing system in an aerial vehicle, such as the systems and methods for receiving input. For example, the systems and methods can receive, by one or more processors, data indicative of finger placement on a three dimensional knob that is associated with a parameter; determine, by the one or more processors, a height associated with the data indicative of finger placement; determine, by the one or more aerial vehicle 102 processors, a gain associated with the parameter based on the height; receive, by the one or more processors, a signal indicative of an adjustment to the parameter; and cause, by the one or more processors, an adjustment to the parameter based on the determined gain and the signal indicative of an adjustment to the parameter. This can reduce the amount of time needed to input a value for a parameter.

FIG. 1 depicts an example system for receiving input according to example embodiments of the present disclosure. As shown, the system can include an aerial vehicle 102. The aerial vehicle 102 can include an onboard computing system 110. As shown in FIG. 1, the onboard computing system 110 can include one or more onboard computing device(s) 104 that can be associated with, for instance, an avionics system. The onboard computing device(s) 104 can be coupled to a variety of systems on the aerial vehicle 102 over a communications network 115. The communications network 115 can include a data bus or combination of wired and/or wireless communication links.

The onboard computing device(s) 104 can be in communication with a display system 125 including one or more display device(s) that can be configured to display or otherwise provide information generated or received by the system 110 to flight crew members of the aerial vehicle 102. The display system 125 can include a primary flight display, a multipurpose control display unit, or other suitable flight displays commonly included within a cockpit of the aerial vehicle 102.

The onboard computing device(s) 104 can also be in communication with a flight control computer 130. The flight control computer 130 can, among other things, automate the tasks of piloting and tracking the flight plan of the aerial vehicle 102. The flight control computer 130 can include or be associated with, any suitable number of individual microprocessors, power supplies, storage devices, interface cards, auto flight systems, flight management computers, and other standard components. The flight control computer 130 can include or cooperate with any number of software programs (e.g., flight management programs) or instructions designed to carry out the various methods, process tasks, calculations, and control/display functions necessary for operation of the aerial vehicle 102. The flight control computer 130 is illustrated as being separate from the onboard computing device(s) 104. Those of ordinary skill in the art, using the disclosures provided herein, will understand that the flight control computer 130 can also be included with or implemented by the onboard computing device(s) 104.

The onboard computing device(s) 104 can also be in communication with one or more aerial vehicle control system(s) 140. The aerial vehicle control system(s) 140 can be configured to perform various aerial vehicle operations and control various settings and parameters associated with the aerial vehicle 102. For instance, the aerial vehicle control system(s) 140 can be associated with one or more engine(s) 120 and/or other components of the aerial vehicle 102. The aerial vehicle control system(s) 140 can include, for instance, digital control systems, throttle systems, inertial reference systems, flight instrument systems, engine control systems, auxiliary power systems, fuel monitoring systems, engine vibration monitoring systems, communications systems, flap control systems, flight data acquisition systems, and other systems.

Any or all of the onboard computing system 110, the on board computing device(s) 104, the flight control computer, and the aerial vehicle control system(s) 140 can include and/or be in communication with input devices. According to example aspects of the present disclosure, the input devices can include three dimensional knobs (or three dimensional rotary dials as described in further detail in reference to FIG. 2 below.

The numbers, locations, and/or orientations of the components of example aerial vehicle 102 are for purposes of illustration and discussion and are not intended to be limiting. Those of ordinary skill in the art, using the disclosures provided herein, shall understand that the numbers, locations, and/or orientations of the components of the aerial vehicle 102 can be adjusted without deviating from the scope of the present disclosure.

Figure 2:
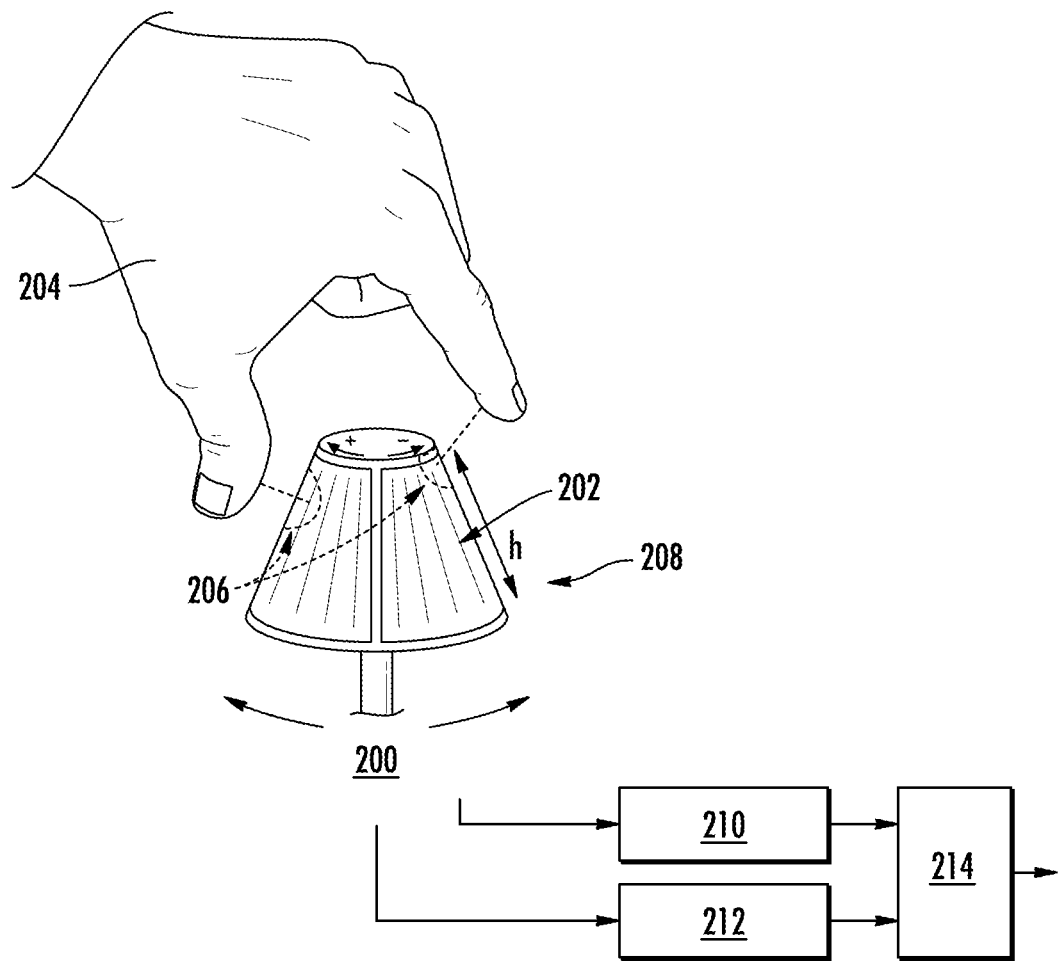
FIG. 2 depicts a three-dimensional knob according to example embodiments of the present disclosure.

FIG. 2 depicts a three dimensional knob 200 according to example embodiments of the present disclosure. The three dimensional knob 200 can be used to adjust a parameter. An amount by which the parameter is adjusted by a turn of the three dimensional knob is the "gain." The three dimensional knob 200 can include a touch sensitive surface 202. The touch sensitive surface 202 can include touch sensors (e.g., capacitive touch sensors) operable to detect placement of fingers 204 on the three dimensional knob 200. For example, two fingers 204 can contact the touch sensitive surface 202, and contact points 206 of the fingers 204 can be determined. A height 208 of the each of the contact points 206 on the knob can be determined. For example, when two fingers 204 create two contact points 206, an average height 208 of the contact points 206 can be determined. The determined height 208 of the contact points 206 (or an average height 208 of the contact points 206) can be used to determine a gain of the parameter. For instance, a rotation angle 210 of the three dimensional knob 200 and the determined height 212 of the contact points 206 can be used to determine gain 214 when the three dimensional knob 200 is adjusted.

As an example, the higher the determined height 208 of the contact points 206, the lower the gain of the parameter (e.g., the more precisely the parameter is adjusted). As another example, the higher the determined height of the contact points, the higher the gain of the parameter (e.g., more values of the parameter are traversed during a turn of the three dimensional knob 200).

The three dimensional knob 200 can have a maximum height and a minimum height. The maximum height can be associated with a top of the three dimensional knob 200. The minimum height can be associated with a bottom of the three dimensional knob 200. For example, the illustrated three dimensional knob 200 is tapered so that a circumference decreases as height increases. The illustrated three dimensional knob 200 has a minimum circumference at the maximum height and a maximum circumference at the minimum height.

Figure 3:
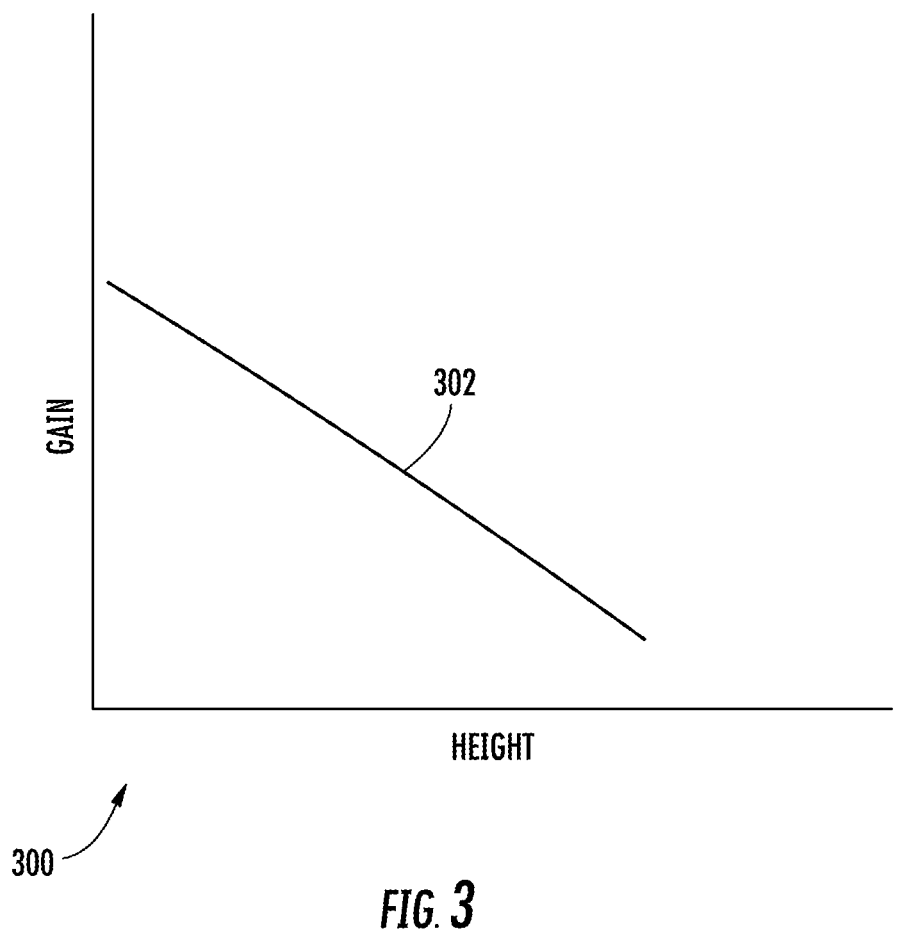
FIG. 3 depicts a graph according to example embodiments of the present disclosure.

FIG. 3 depicts a graph 300 that shows an adjustment function defining a relationship between a height of contact points and a gain applied to an associated parameter according to example embodiments of the present disclosure. FIG. 3 plots height along the horizontal axis and gain along the vertical axis. As shown by curve 302 an inverse linear relationship exists between the height of the contact points and the gain applied to the associated parameter. In such a relationship, the higher the height of the contact points, the lower the gain applied to the parameter. Although the graph 300 depicts a specific relationship, such a specific relationship is only an example. Any relationship between the average height of contact points and the gain applied to the associated parameter is envisioned.

Figure 4:
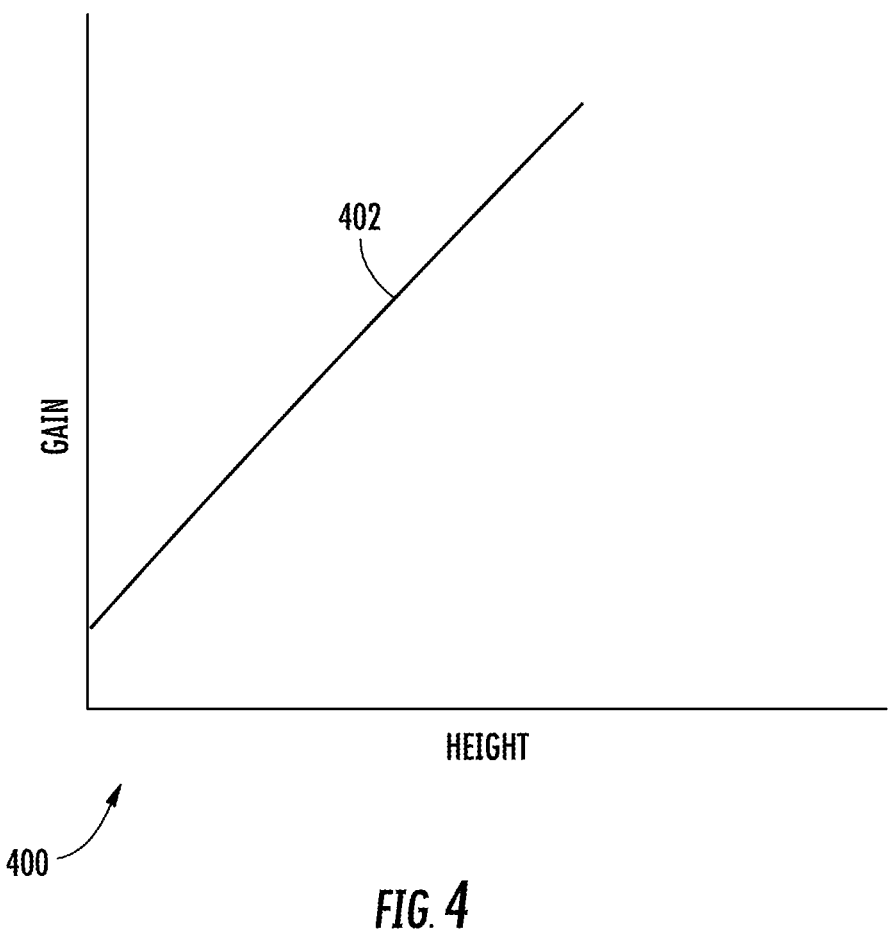
FIG. 4 depicts a graph according to example embodiments of the present disclosure.

For instance, FIG. 4 depicts a graph 400 that shows an adjustment function defining a relationship between a height of contact points and a gain applied to an associated parameter according to example embodiments of the present disclosure. As shown by curve 402 a direct linear relationship exists between the height of the contact points and the gain applied to the associated parameter. In such a relationship, the higher the height of the contact points, the higher the gain applied to the parameter.

Figure 5:
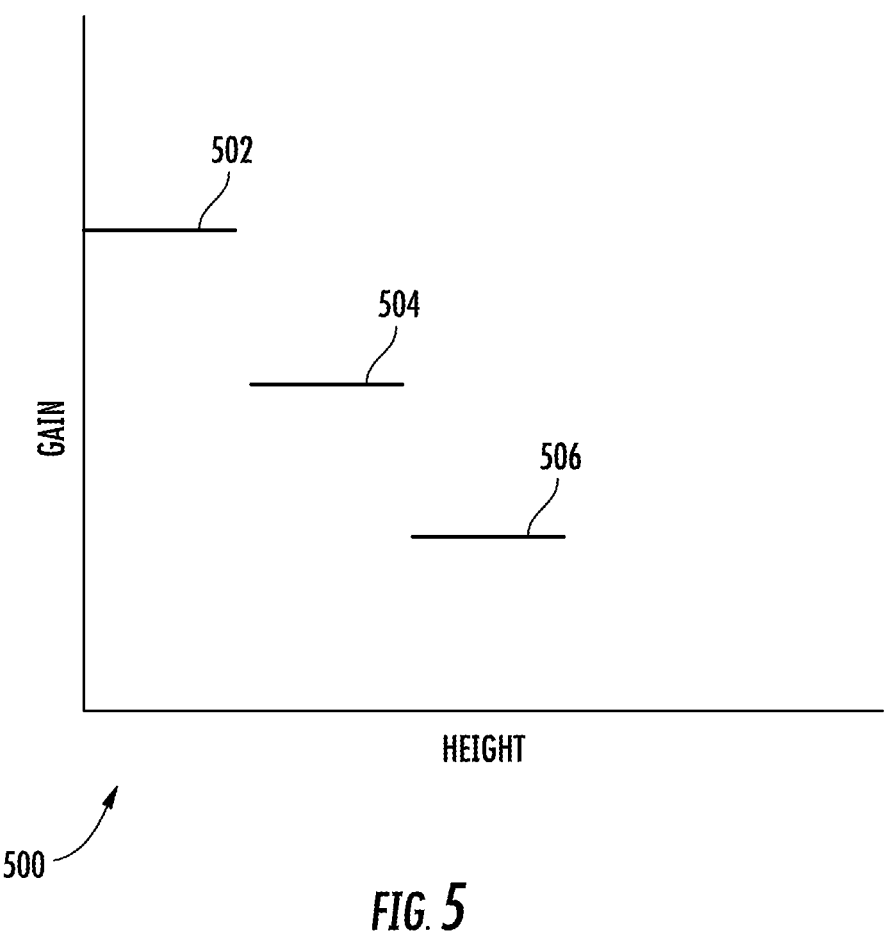
FIG. 5 depicts a graph according to example embodiments of the present disclosure.

As another example, FIG. 5 depicts a graph 500 that shows an adjustment function defining a relationship between a height of contact points and a gain applied to an associated parameter according to example embodiments of the present disclosure. As shown by curves 502, 504, 506 a step function correlates the height of the contact points and the gain applied to the associated parameter. In such a relationship, contact points determined to have an average height below a first threshold have a highest gain (corresponding to the line 502), contact points determined to have an average height at or above the first threshold but below a second threshold have a medium gain (corresponding to the line 504), and contact points determined to have an average height at or above the second threshold have a lowest gain (corresponding to the line 506).

Figure 6:
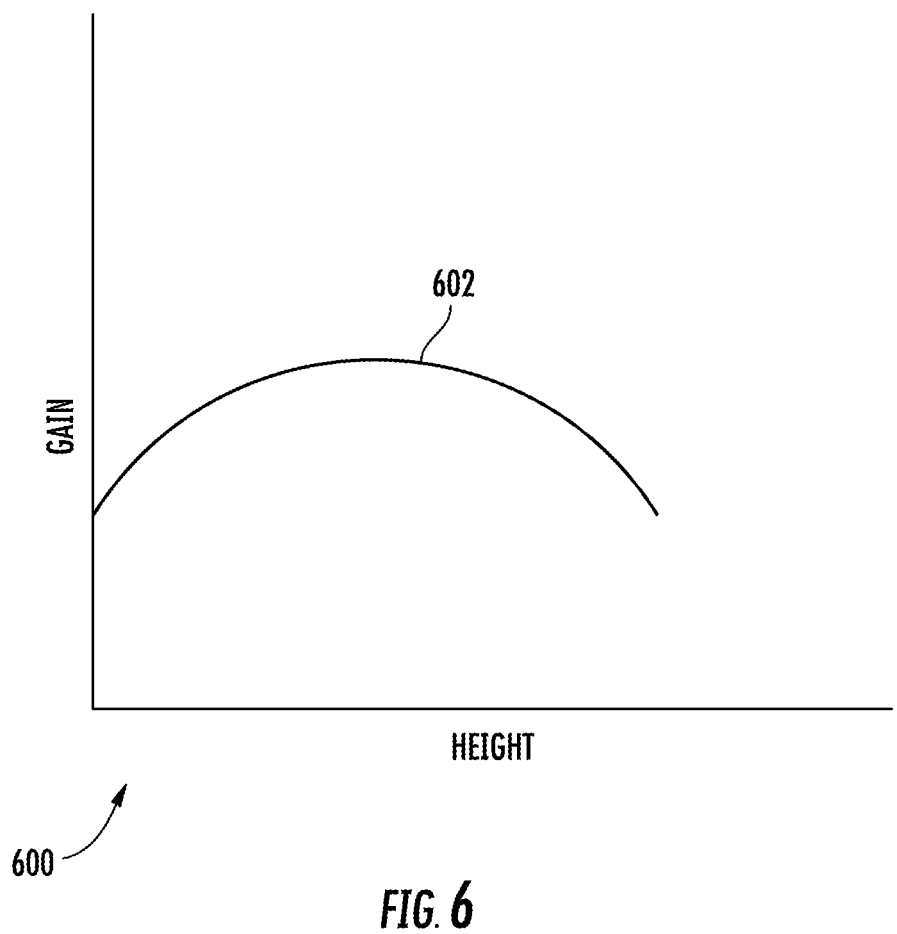
FIG. 6 depicts a graph according to example embodiments of the present disclosure.

As yet another example, FIG. 6 depicts a graph 600 that shows an adjustment function defining a relationship between a height of contact points and a gain applied to an associated parameter according to example embodiments of the present disclosure. As shown by curve 602 a non-linear relationship defined by the arc associated with curve exists wherein the gain applied to the associated parameter can be the same at multiple, non-consecutive heights.

Figure 7:
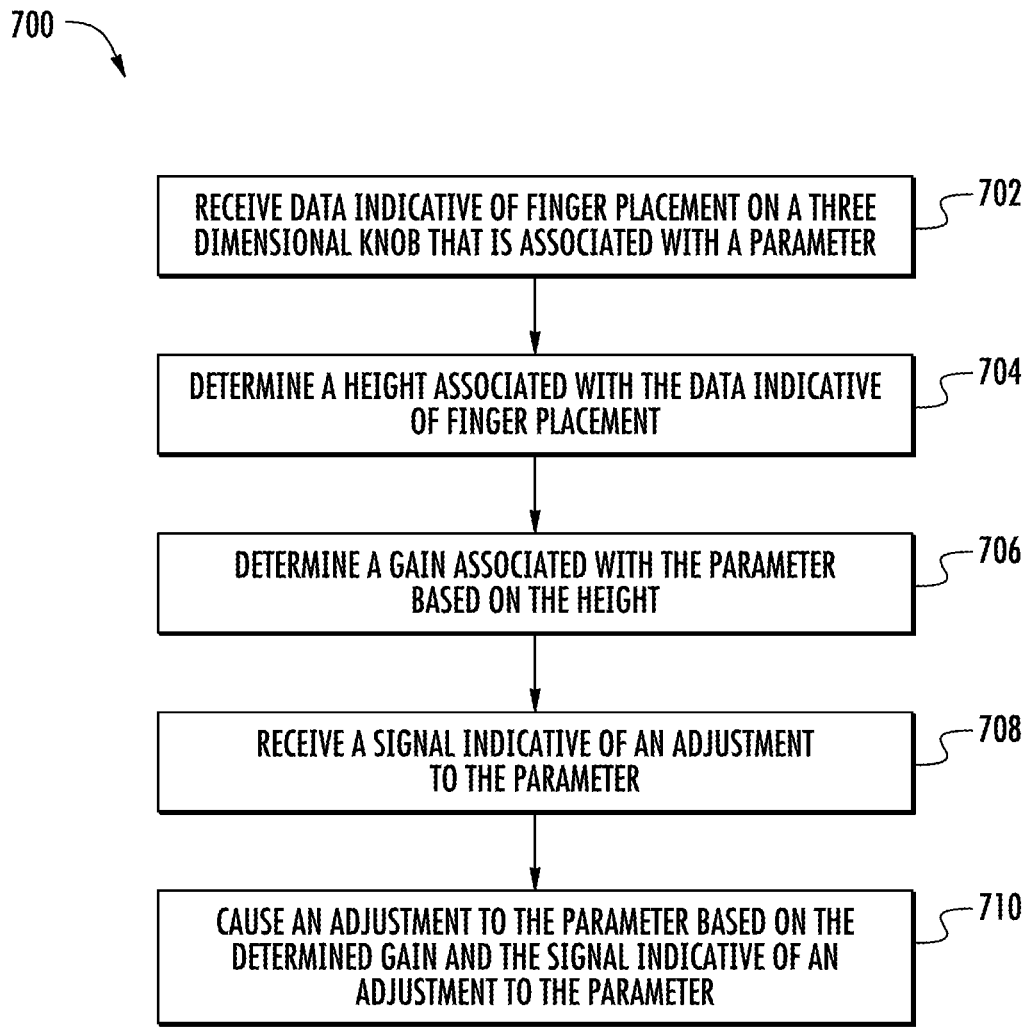
FIG. 7 depicts a flow diagram of an example method according to example embodiments of the present disclosure.

FIG. 7 depicts a flow diagram of an example method 700 for receiving input. The method of FIG. 7 can be implemented using, for instance, the one or more processor(s) 804 of the control system 800 of FIG. 8. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, performed simultaneously, or modified in various ways without deviating from the scope of the present disclosure.

At (702), data indicative of finger placement on a three dimensional knob that is associated with a parameter can be received. For example, the processor 804 can receive data indicative of finger placement on a three dimensional knob that is associated with a parameter. In an aspect, the parameter can be associated with one of the following: heading, altitude, and temperature. In an embodiment, a signal indicative of placement of a first finger can be received. For example, the processor 804 can receive a signal indicative of placement of a first finger. In an embodiment, a signal indicative of placement of a second finger can be received. For example, the processor 804 can receive a signal indicative of placement of a second finger. The signals can be received, for instance, from touch sensors. In example embodiments, the touch sensors are capacitive sensors.

At (704), a height associated with the data indicative of finger placement can be determined. For example, the processor 804 can determine a height associated with the data indicative of finger placement. In an embodiment, a first height associated with the signal indicative of placement of the first finger can be determined. For example, the processor 804 can determine a first height associated with the signal indicative of placement of the first finger. In an embodiment, a second height associated with the signal indicative of placement of the second finger can be determined. For example, the processor 804 can determine a second height associated with the signal indicative of placement of the second finger. In an embodiment, an average height can be determined based on the first height and the second height. For example, the processor 804 can determine an average height (e.g., mean height, median height, etc.) based on the first height and the second height. Other suitable measures of height can be used without deviating from the scope of the present disclosure.

At (706), a gain associated with the parameter can be determined based on the height. For example, the processor 804 can determine a gain associated with the parameter based on the height. The gain can be determined based on an algorithm, lookup table, function, and/or correlations relating the gain to the determined height. The gain can be determined, for instance, using any of the relationships depicted in FIGS. 3-6.

At (708) of FIG. 7, a signal indicative of an adjustment to the parameter can be received. For example, the processor 804 can receive a signal indicative of an adjustment to the parameter. In an embodiment, the signal indicative of an adjustment to the parameter can be generated in response to a turn of the three dimensional knob and can be based on the angle of rotation of the knob.

At (710), an adjustment to the parameter can be caused based on the determined gain and the signal indicative of an adjustment to the parameter. For example, the processor 804 can cause an adjustment to the parameter based on the determined gain and the signal indicative of an adjustment to the parameter.

Figure 8:
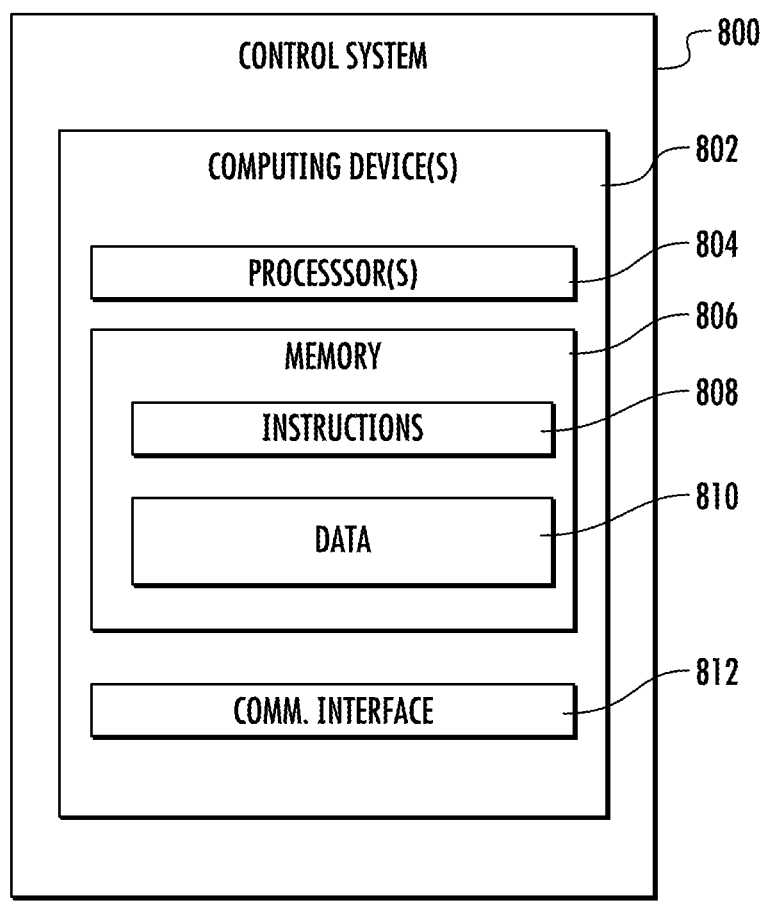
FIG. 8 depicts a control system for implementing one or more aspects according to example embodiments of the present disclosure.

FIG. 8 depicts a block diagram of an example control system 800 that can be used to implement methods and systems according to example embodiments of the present disclosure. The control system 800 can be any control device or system described with reference to FIG. 1. As shown, the control system 800 can include one or more computing device(s) 802. The one or more computing device(s) 802 can include one or more processor(s) 804 and one or more memory device(s) 806. The one or more processor(s) 804 can include any suitable processing device, such as a microprocessor, microcontroller, integrated circuit, logic device, or other suitable processing device. The one or more memory device(s) 806 can include one or more computer-readable media, including, but not limited to, non-transitory computer-readable media, RAM, ROM, hard drives, flash drives, or other memory devices.

The one or more memory device(s) 806 can store information accessible by the one or more processor(s) 804, including computer-readable instructions 808 that can be executed by the one or more processor(s) 804. The instructions 808 can be any set of instructions that when executed by the one or more processor(s) 804, cause the one or more processor(s) 804 to perform operations. The instructions 808 can be software written in any suitable programming language or can be implemented in hardware. In some embodiments, the instructions 808 can be executed by the one or more processor(s) 804 to cause the one or more processor(s) 804 to perform operations, such as the operations for receiving input, as described with reference to FIG. 7.

The memory device(s) 806 can further store data 810 that can be accessed by the one or more processor(s) 804. For example, the data 810 can include any data used for receiving input, as described herein. The data 810 can include one or more table(s), function(s), algorithm(s), model(s), equation(s), etc. for receiving input according to example embodiments of the present disclosure.

The one or more computing device(s) 802 can also include a communication interface 812 used to communicate, for example, with the other components of system. The communication interface 812 can include any suitable components for interfacing with one or more network(s), including for example, transmitters, receivers, ports, controllers, antennas, or other suitable components.

Figure 9:
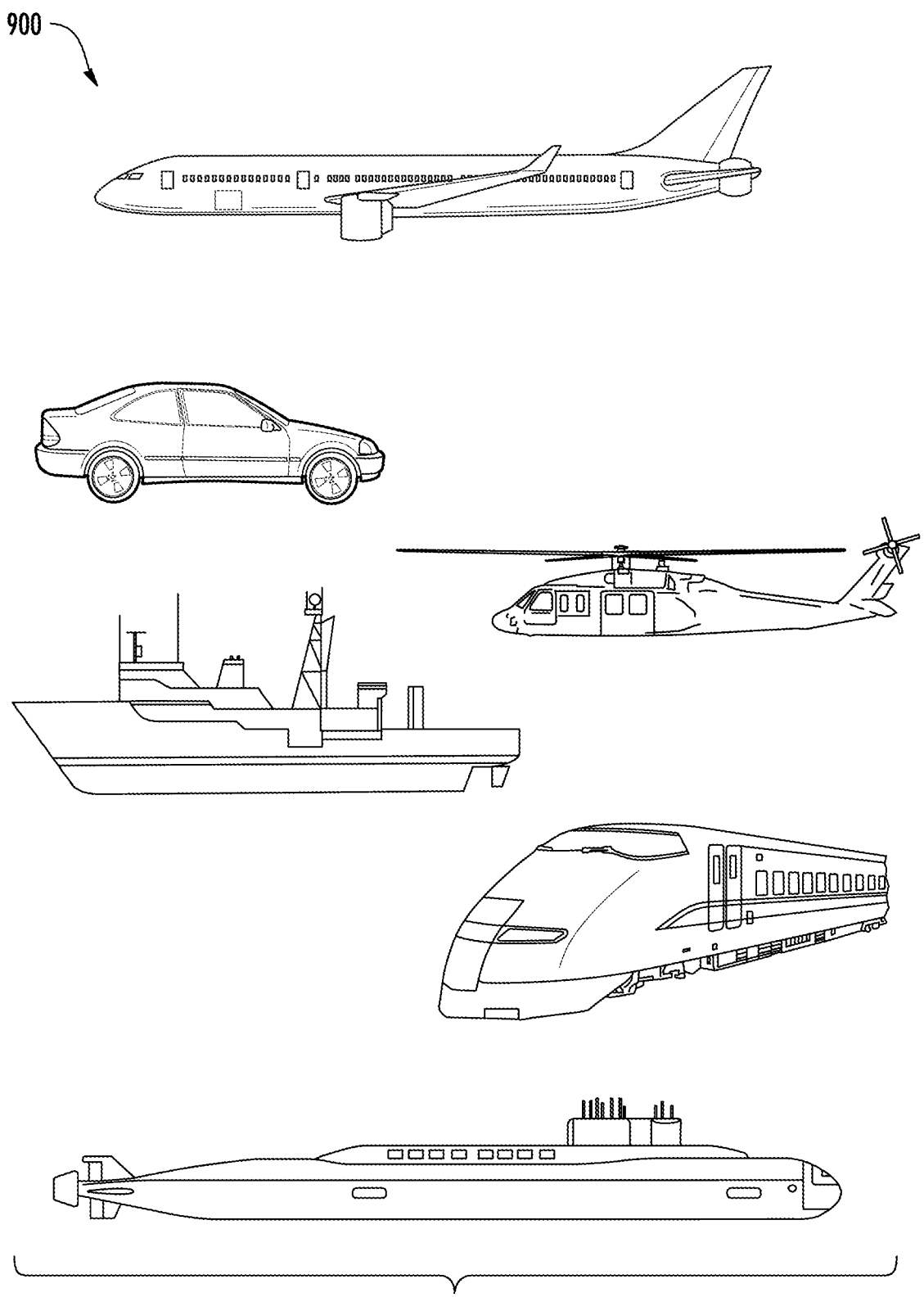
FIG. 9 depicts example vehicles according to example embodiments of the present disclosure.

Referring now to FIG. 9, example vehicles 900 according to example embodiments of the present disclosure are depicted. The systems and methods of the present disclosure can be implemented on an aerial vehicle, helicopter, automobile, boat, submarine, train, and/or any other suitable vehicles. While the present disclosure is described herein with reference to an aerial vehicle implementation, this is intended only to serve as an example and not to be limiting. One of ordinary skill in the art would understand that the systems and methods of the present disclosure can be implemented on other vehicles without deviating from the scope of the present disclosure.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for receiving input comprising:
   receiving, by one or more computing devices, data indicative of finger placement on a three dimensional knob that is associated with a parameter;
   determining, by the one or more computing devices, a height associated with the data indicative of finger placement;
   determining, by the one or more computing devices, a gain associated with the parameter based on the height;
   receiving, by the one or more computing devices, a signal indicative of an adjustment to the parameter, wherein the signal indicative of the adjustment to the parameter is generated in response to a turn of the three dimensional knob; and causing, by the one or more computing devices, an adjustment to the parameter based on the determined gain and the signal indicative of an adjustment to the parameter.

2. The method of claim 1, wherein the three dimensional knob comprises a first end and a second end, wherein the first end is associated with a maximum height of the three dimensional knob, and wherein the second end is associated with a minimum height of the three dimensional knob.

3. The method of claim 2, wherein a minimum gain is associated with the first end and a maximum gain is associated with the second end.

4. The method of claim 3, wherein determining the gain associated with the parameter based on the height further comprises:

accessing, by the one or more computing devices, an adjustment function correlating the gain with the height; and determining, by the one or more computing devices, the gain based at least in part on the adjustment function.

5. The method of claim 4, wherein the adjustment function specifies a linear relationship between the height and the gain.

6. The method of claim 4, wherein the adjustment function specifies a non-linear relationship between the height and the gain.

7. The method of claim 2, wherein a maximum gain is associated with the first end and a minimum gain is associated with the second end.

8. The method of claim 7, wherein determining the gain associated with the parameter based on the height further comprises:

accessing, by the one or more computing devices, an adjustment function correlating the gain with the height; and determining, by the one or more computing devices, the gain based at least in part on the adjustment function.

9. The method of claim 8, wherein the adjustment function specifies a linear relationship between the height and the gain.

10. The method of claim 8, wherein the adjustment function specifies a non-linear relationship between the height and the gain.

11. The method of claim 1, wherein the parameter is associated with one of the following: heading, altitude, and temperature.

12. The method of claim 1, wherein receiving one or more signals indicative of finger placement on a three dimensional knob further comprises:

receiving a signal indicative of placement of a first finger; and receiving a signal indicative of placement of a second finger.

13. The method of claim 12, wherein determining a height associated with the one or more signals further comprises:

determining a first height associated with the signal indicative of placement of the first finger;

determining a second height associated with the signal indicative of placement of the second finger; and determining an average height based on the first height and the second height.

14. The method of claim 1, wherein the gain is determined as a continuous parameter based on the height.

15. A system for receiving input comprising:

a memory device;

a three dimensional knob configured to adjust a parameter; and one or more processors configured to:

receive one or more signals indicative of finger placement on the three dimensional knob, wherein in receiving the one or more signals, the one or more processors are configured to receive a signal indicative of placement of a first finger and receive a signal indicative of placement of a second finger on the three dimensional knob;

determine a height associated with the one or more signals;

determine a gain associated with the parameter based on the determined height;

receive a signal indicative of an adjustment to the parameter; and cause an adjustment to the parameter based on the determined gain and the signal indicative of the adjustment to the parameter.

16. The system of claim 15, wherein the one or more processors are further configured to:

access an adjustment function correlating the gain with the height; and determine the gain based at least in part on the adjustment function.

17. The system of claim 16, wherein the adjustment function specifies a linear relationship between the height and the gain.

18. The system of claim 16, wherein the adjustment function specifies a non-linear relationship between the height and the gain.

19. The system of claim 16, wherein the adjustment function specifies an inverse relationship between the height and the gain.

20. An aerial vehicle comprising:

a memory device;

a three dimensional knob configured to adjust a parameter; and one or more processors configured to:

receive one or more signals indicative of finger placement on the three dimensional knob;

determine a height associated with the one or more signals;

receive a signal indicative of an adjustment to the parameter, wherein the signal indicative of the adjustment to the parameter is descriptive of an angle of rotation of the three dimensional knob;

determine a gain associated with the parameter based on the determined height and the angle of rotation of the three dimensional knob;

cause an adjustment to the parameter based on the determined gain.

* * * * *